United States Patent

Schroder et al.

[15] 3,648,024
[45] Mar. 7, 1972

[54] SENSING DEVICE

[72] Inventors: Jurgen Schroder, Hamburg; Onno Wichmann; Werner Zuchner, both of Bremen, all of Germany

[73] Assignee: U. S. Philips Corporation, New York, N.Y.

[22] Filed: Apr. 28, 1970

[21] Appl. No.: 32,559

[30] Foreign Application Priority Data

May 20, 1969 Germany ..................P 19 25 488.7

[52] U.S. Cl. ..........................235/61.11 E, 234/35, 101/19, 235/61.12 R
[51] Int. Cl. ..................G06k 7/14, G06k 1/20, G06k 19/08, B44b 5/02
[58] Field of Search ..........................234/121, 35; 101/19; 235/61.12 R, 61.11, 61.11 E, 61.7, 61.6; 340/149 A

[56] References Cited

UNITED STATES PATENTS

| | | | |
|---|---|---|---|
| 3,143,060 | 8/1964 | Sonier | 101/19 |
| 3,049,989 | 8/1962 | Edburg | 101/19 |
| 3,548,160 | 12/1970 | Welsh | 235/61.6 R |
| 2,482,242 | 9/1949 | Brustman | 340/149 A |
| 3,051,079 | 8/1962 | Platzman | 101/19 |
| 3,361,344 | 1/1968 | Cudmore | 234/121 X |
| 3,135,461 | 6/1964 | Biegel | 234/121 X |
| 3,519,202 | 7/1970 | Rogers | 234/35 |

*Primary Examiner*—Maynard R. Wilbur
*Assistant Examiner*—Robert M. Kilgore
*Attorney*—Frank R. Trifari

[57] ABSTRACT

A memory device for simulating the perforations of a punched card using a group of elongated parallel plates each having at least one perforation mutually slideably mounted and a device for moving the slideable plates using a magnetically operated mechanical lever system for sequentially sliding each plate a predetermined distance.

2 Claims, 7 Drawing Figures

SENSING DEVICE

The invention relates to a device for optically sensing data recorded on punched cards as well as adjustable variable data associated therewith.

It is the object of the invention to provide a device with which fixed data recorded in punched cards and variable data introduced via setting devices which can be operated manually or electrically, can be introduced into a data-handling system from a decentral place.

A number of devices are known in which it is possible to realize the sensing of punched cards and the introduction of variable data via feelers, adjusting levers, switches and the like from a decentral place to a data-handling device. These devices are required in those cases in which the available information is to be supplied from its place of origin to a central data-handling system. This necessity occurs, for example, in manufacturing where the available manufacturing data for control and checking purposes have to be supplied, via introduction devices and data transmission channels, to a central control place.

Many of these devices operate by means of mechanical brush sensing of the punched card and by means of manually adjustable mechanical contacts (see, for example, German Auslegeschrift 1,249,568). These known devices have the drawback that on the basis of the mechanical sensing only comparatively low speeds for the sensing and the transmission of the data are possible. Moreover, these mechanical sensing devices have only a low reliability since the sensing means are subject to mechanical detrition. In addition, the manually operated adjusting means cannot be sensed with the same sensing device as the punched card.

The optically operating sensing device according to the invention avoids all the said drawbacks and is characterized in that the adjustable variable data are determined by the position of plates which are arranged so as to be movable parallel to the columns of the punched cards, the dimensions of said plates corresponding to the structure of the rows and columns of the punched cards, the plates being provided with apertures in the form of holes in a punched card. In the device according to the invention, known optic sensing methods with moving light beams can be used in which the sensing of the introduced data can be repeated as often as is desirable. This repeated sensing and subsequent transmission of the data is necessary, for example, to correct errors occurring during the transmission of the data from the introduction device to the data-handling device, due to the repeated transmission. The device according to the invention moreover has the advantage that the movement of the plates can be carried out by means of electromechanical adjusting means which are operated by electric contacts so that, for example, quantity or weight meters with electric contacts can immediately be connected for introducing the measured value.

In order that the invention may be readily carried into effect, one embodiment of the device according to the invention will now be described with in greater detail, by way of example, with reference to the accompanying drawings, in which.

Figure 1:
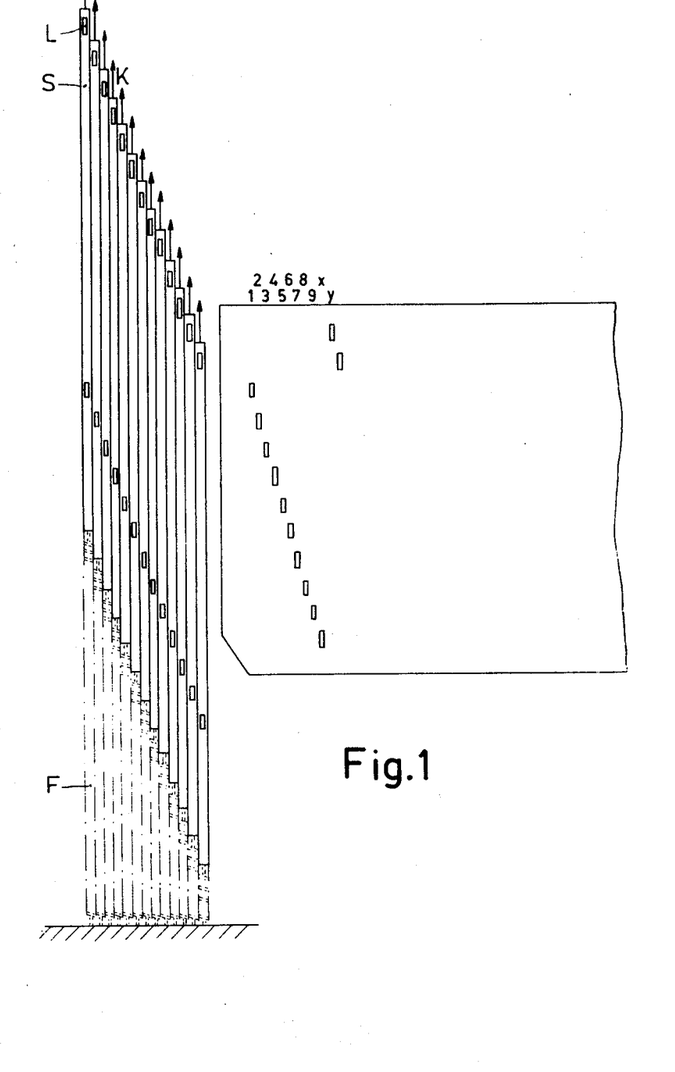
FIG. 1 diagrammatically shows a punched card with adjustable plates arranged beside it.
Figure 2A:
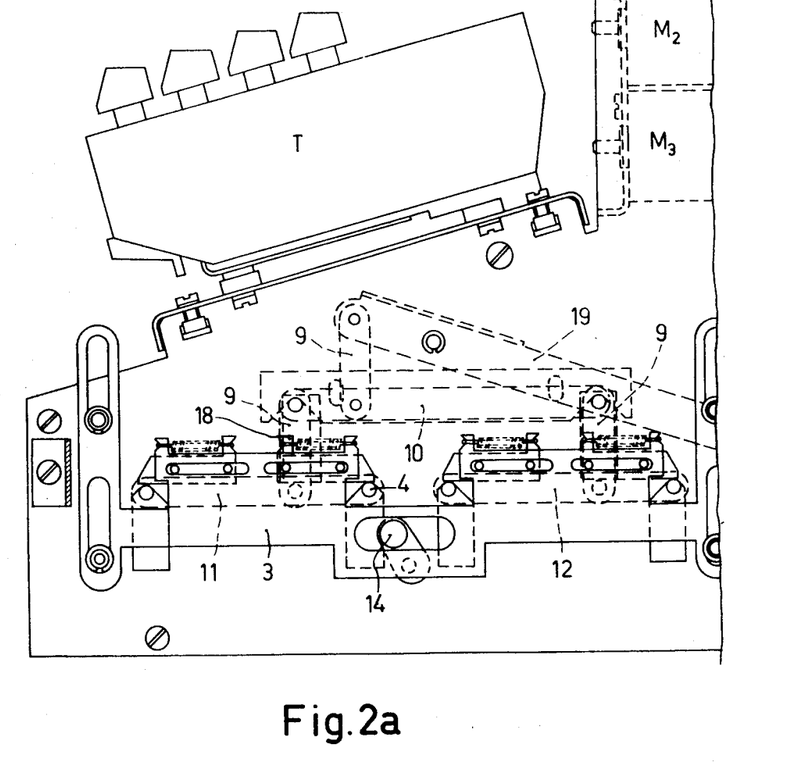
FIGS. 2A and 2B diagrammatically show a device for adjusting the plates.
Figure 2B:
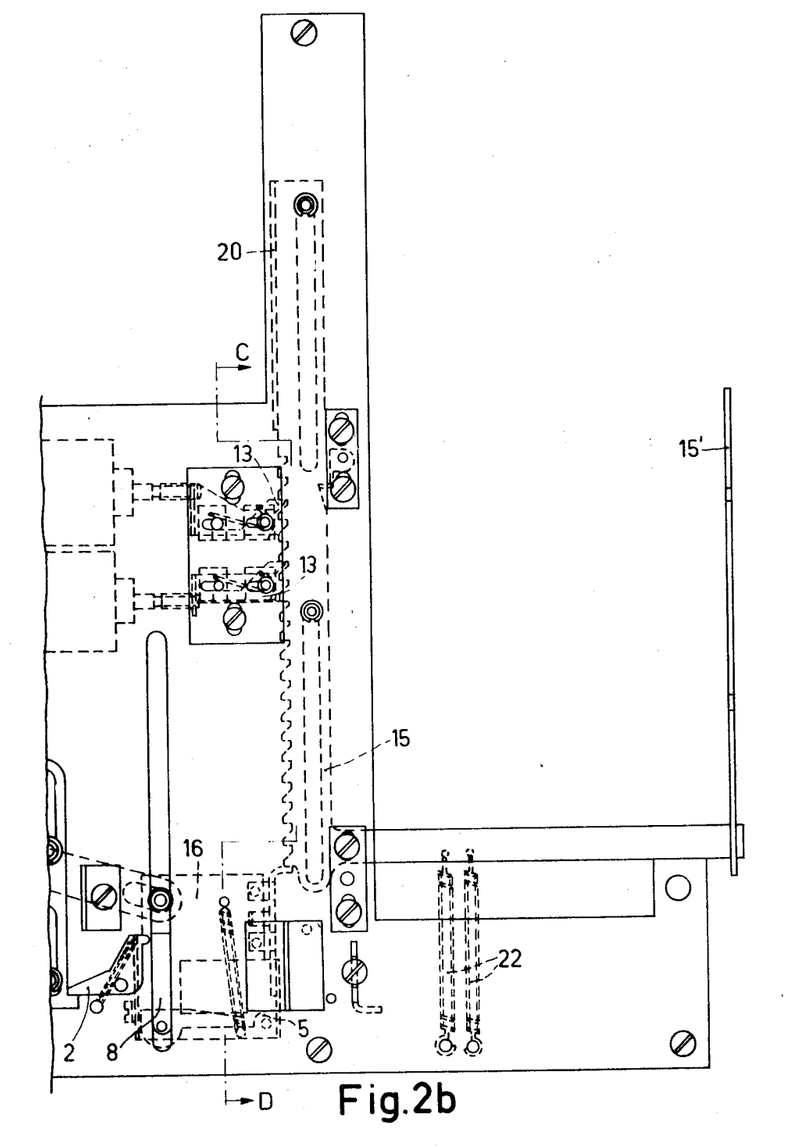

The mechanical punched card memory shown in FIG. 1 is formed by plates S each being provided with two apertures L which, as regards their dimensions, correspond to the holes in a punched card. Each of the plates S is provided with two apertures so as to cause the digits 0 to 9 to correspond to the steps 1 to 10 and the positions "X" and "Y" to the steps 12 and 13. The step 11 corresponds to the value "blank" is therefore not punched. Each plate S can be displaced 12 steps under the action of a force K. Each step corresponds to a height of a row of a punched card. When the force K is not operative on the plates, springs F pull the plates S back to their zero position.

The general operation of the device will first be explained. A keyboard with coded output of the keyed digits or symbols influences electromagnets which adjust a motor-driven differential mechanism which, in accordance with the number and the manner of the energized magnets, moves a slide vertically by a given number of steps. The number of the steps follows from the keyed value and from the positions of the associated punching in the punched card. The maximum number of steps is 12 which corresponds to the number of rows on a punched card.

As a result of its vertical movement, the slide moves a plate of the mechanical punched card memory which meshes with said slide. After positioning the plate in question, the slide returns to its initial position while simultaneously the slide makes a step in the horizontal direction and thereby reaches a position in which the adjacent plate can be adjusted.

The keyed and stored values are made visible in a simple manner by moving rods on which the values which are stored are displayed. These rods are rigidly secured to the plates of the memory or are constructed as one part thereof. A high reliability in operating the device during introducing data is reached in that the number of steps per introduced symbol is checked. After introducing the desirable number of steps, the slide is stopped in the last position by means of a blocking magnet and a released signal is supplied to the electronic operating system, only when the introduction of the required position has been signalled. As a result of this the electronic control system can prevent the introduction of further data by blocking the keyboard. On the other hand, as long as not all the required symbols have been introduced in the correct manner no further control orders, such as "beginning transmission data", are carried out by the electronic control system.

Figure 3A:
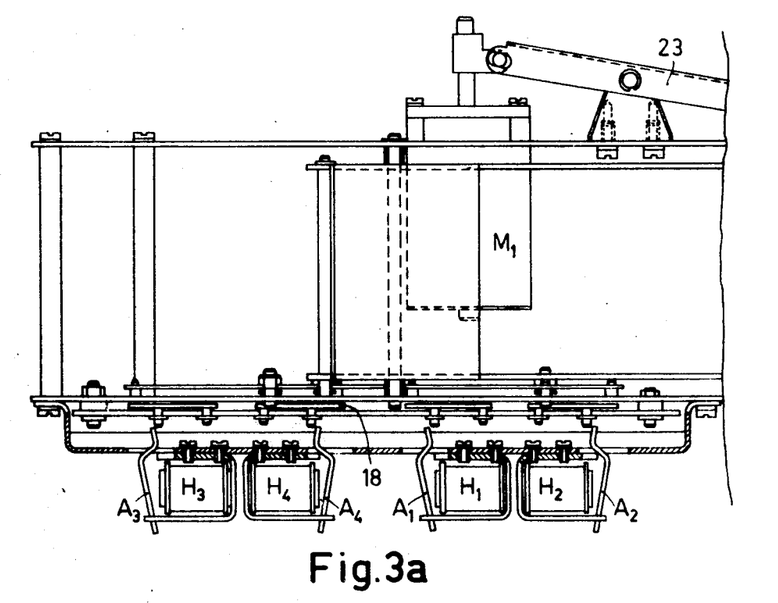
FIGS. 3a and 3b comprises a plan view of the device shown in FIGS. 2a and 2b.
Figure 3B:
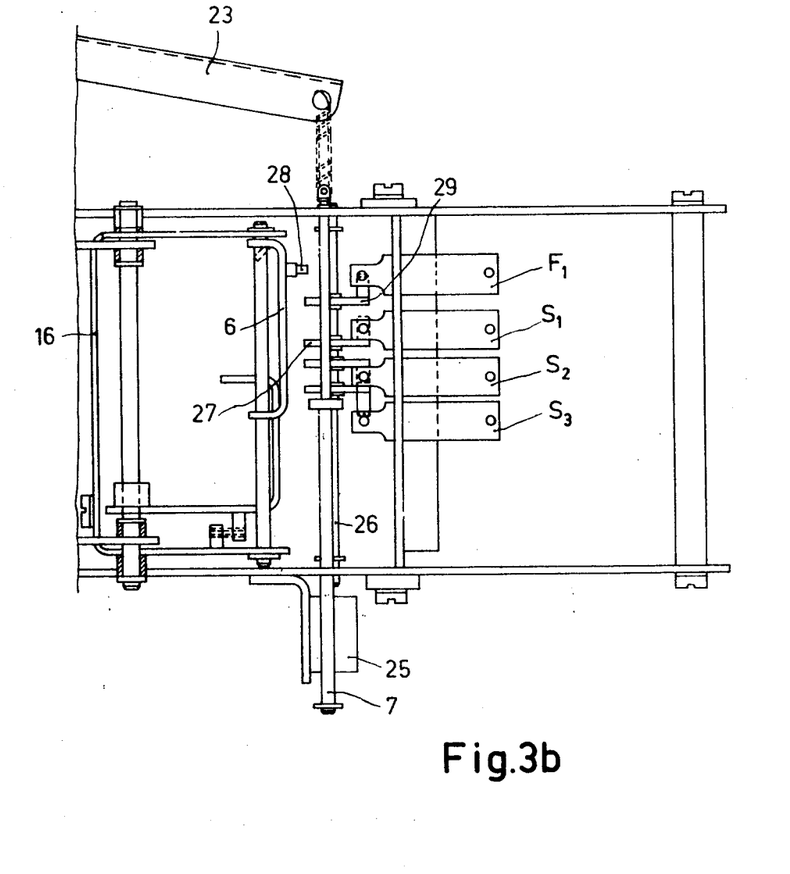
Figure 4:
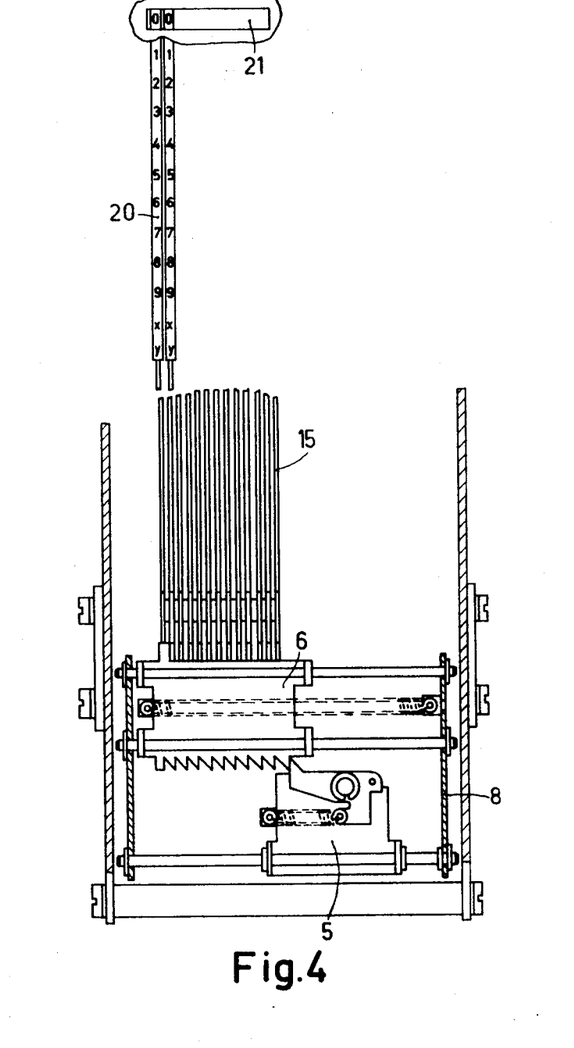
FIG. 4 is a diagrammatic cross-sectional view of the device.

The keyboard T (FIG. 2) cooperates by means of electric contacts with four magnets $H_1$, $H_2$, $H_3$ and $H_4$ (FIG. 3). The digits 0........9 and the punchings X and Y as well as blank (no punching) are reproduced by a particular choice of the energization of the magnets $H_1$ to $H_4$. When, for example, a keyboard with a translation of the symbols according to a binary code is used, the weight factors, 1, 2, 4 and 8 are alotted to the magnets $H_1$ to $H_4$. When the key "7", for example, is touched, the magnets $H_1$, $H_2$ and $H_3$ (weight sum 1+2+4=7) are not energized (inverted reproduction). By energizing the magnet $H_4$, the armature $A_4$ moves the sliding member 18 which releases the right-hand bolt 4 of the lever 11. (FIG. 3) The two levers 11 and 12 as well as the lever 10 which are connected by ties 9 constitute a differential driving mechanism which influences the slide 16 by means of the lever 19. In our example the whole differential driving mechanism, after release of the bolt 4, is moved downwards via the sliding member 3 during half a revolution of the crank 14. The lever 19 moves the slide 16 upwards by seven steps (corresponding to seven rows of a punched card). The slide 16 moves the toothed rack 15 which is held in the reached position by the lock 13. A tooth rack 15 is associated with each plate 15' of the mechanical punched card memory. After adjusting a plate in the desirable position, the differential driving mechanism is returned to its initial position during the second half of the revolution of the crank 14, while the lock 2 is energized and unlocks the switching lock 5 (FIG. 4) via a rod 8. As a result of this the slide 6 can move one step to its following position in which it cooperates with the adjacent toothed rack. When introducing the next symbol via the keyboard by means of the differential driving mechanism, the lifting slide 16, and the associated toothed rack 15, the plate can be adjusted for the next position in the mechanical memory. When the desirable data are introduced and the associated plate positioned, the digits or symbols provided on the front 20 of the toothed racks 15 are available in a window 21 for reading (FIG. 4). In this manner it is possible to check the introduced symbols optically.

The erasing of the mechanical memory, that is to say resetting the plates 15 to their initial position, is effected in that the locks 13 are energized by the erasing magnets $M_2$ or $M_3$, as a result of which the toothed racks are released and are pulled to their initial position by the springs 22. Moreover, the tensioning bar 7 is moved in the longitudinal direction via the resetting magnet $M_1$ and the lever 23 (FIG. 3) so that the slide 6 is returned to its initial position, The erasing magnet $M_3$ and the resetting magnet $M_1$ are energized on the one hand by a correction key on the keyboard so as to be able to correct, during the manual introduction of data, data which are already introduced and, on the other hand, by an electronic erasing pulse so as to be able to erase automatically the contents of the memory. This erasing pulse is given, for example, when the introduced memory values together with the punched cards have been sensed and transmitted.

With this construction it is possible to check the introduced variable data automatically as regards their number in that the sensing of the introduced data takes place only when the total number of required data has been introduced. This function is obtained by blocking magnets $S_1$, $S_2$ or $S_3$ (FIG. 3). The movement of the slide 5 is limited by an abutment energized by one of the blocking magnets $S_1$, $S_2$ or $S_3$. A release contact in the microswitch 25 is closed by an abutment cam 28 provided on the slide 6, by taking along the shaft 26 which is situated below the tensioning bar 7 and on which the abutment 27 is mounted. When the release contacts are closed, the sensing operation of the mechanical memory is released. At the same time the closed release contact blocks the keyboard so that no further introduction can take place. As a result of this an error-free introduction of data and a reliable operation are ensured. The choice of the blocking magnets $S_1$, $S_2$ or $s_3$, and hence an automatic limiting of the number of data to be introduced can be controlled according to a particular program as will be explained in detail with reference to FIG. 5.

It is often desirable to maintain a number of introduced data unvaried and independent of further introduction and to enable an erasing and reintroducing of said so-called semivariable data only via a separate device, for example, a keying circuit. This is obtained by a release magnet $F_1$ which is energized by a keying switch, after which the slide adjusts in the first position of the semivariable data. The blocking of the semivariable data is obtained in that the abutment 28 of the slide 6 is stopped by the abutment member 29 provided on the shaft 26, so that the movement of the slide is restricted. For erasing the semivariable data the magnet $F_1$ is energized. As a result of this the abutment cam 27 releases the bolt 28, so that the slide 6, after energization of the resetting magnet $M_1$, is returned to its initial position. At the same time, the erasing magnet $M_2$ associated with the semivariable data, is energized and releases the locks 13 of the toothed racks 15 associated with the semivariable data, after which the plates which serve for storing the semivariable data return to their zero position.

Figure 5:
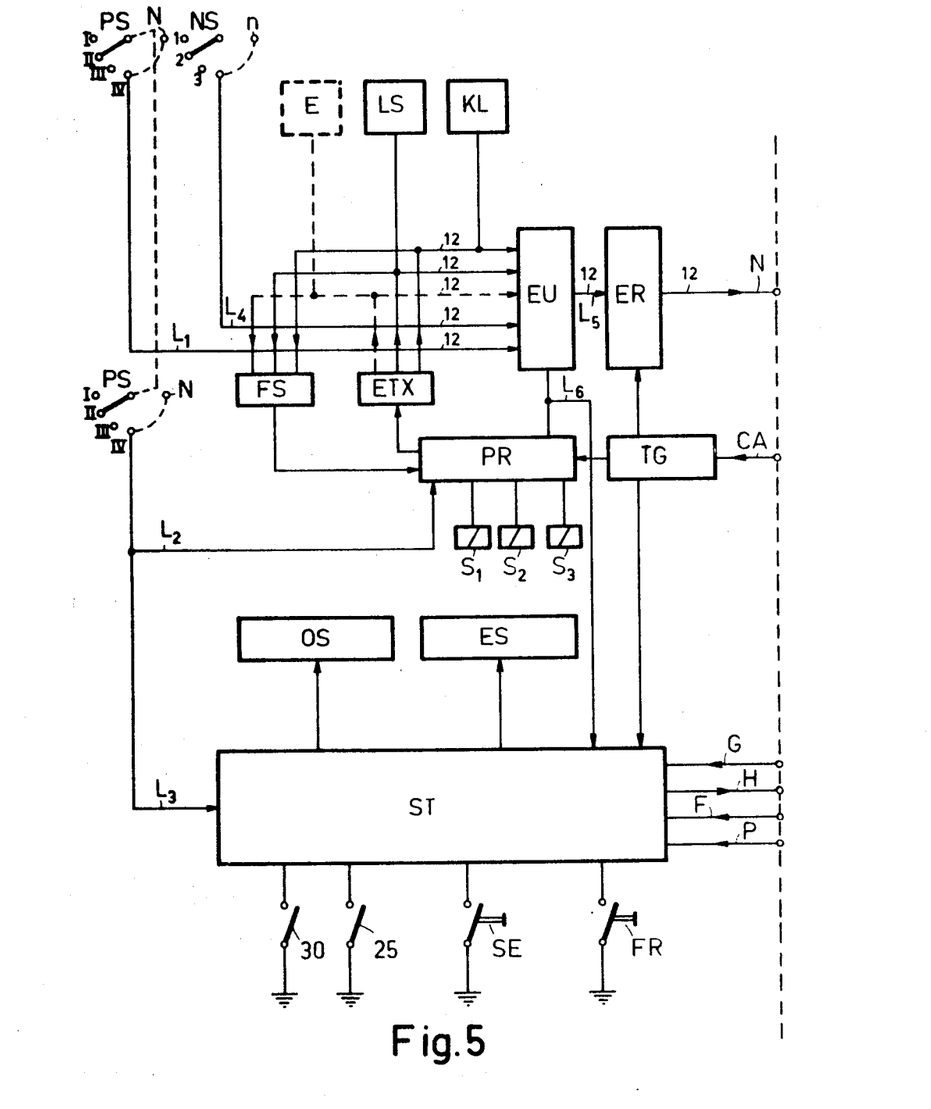
FIG. 5 diagrammatically shows the circuit diagram for the whole device.

The electronic circuit for controlling the whole device and for transmitting the data to a data handling device will now be described in detail with reference to FIG. 5. Data signals are transmitted symbolwise over each time 12 lines (for example, translated in the 12-bit punched card code) to an introducing switch EU from the punched card reader KL, the mechanical punched card memory LS and/or an electric signal input E. The data lines coming from the various inputs are transmitted to a bundle of lines $L_5$ by the introducing switch EU controlled by the program register PR. The program register PR is adjusted via the lines $L_2$ by the program switch PS in such manner that, in a sequence controlled by the chosen program via the line $L_6$, the data of the inputs LS, KL and E are transmitted to the register ER by means of the introducing switches EU. The program register PR thus ensures that the data ordered by the various inputs are built up to a given message in a previously fixed sequence.

The data transmission device controls, for example, by signals CA, the symbolwise order of the message via the lines N from the register ER in the rhythm of the desirable transmission speed by synchronization of the pulse generator TG. In order to inform the data receiver in what manner the information received is composed, the adjusted program (adjustment of the program switch PS) is also incorporated in the register ER via the lines L1 and the switch EU. Since several devices of the type described can give their message to the central station, the station number is also recorded so as to be able to recognize the place of origin of the message. The switch NS enables the adjustment of this station number which, as already described in the program switch PS, is added to the switch EU via lines $L_4$. A structurally simple solution for the station number adjustment is obtained by the introduction thereof in the mechanical punched card memory LS and subsequent locking against erasing. The introduction of data through one of the inputs E, LS or KL is ended by a particular symbol "FS". This particular symbol is recognized by the circuit FS and signals the program register PR that the switch EU can be connected to the next input. The last symbol of a given message is always a particular symbol "FS" which is converted into the particular signal "ETX" via the circuit ETX by the program register PR. This particular symbol ends the message to be transmitted. The program register PR also controls the blocking magnets S1, S2 and S3 in accordance with the program for checking the positions in the case of variable data introduction. When, for example, program III is chosen and six places for the variable data inputs are necessary, the blocking magnet S2 is energized which restricts the introduction to six places.

Electromechanical controlling means (magnets, couplings) and optic signals which demonstrate to the user the operating condition of the device are operated by the control ST. The transmission of a message is started by the user by operating the transmission key SE. The release key FR enables the correction of a given input operation prior to the transmission of a message (for example, renewed keying of variable data or changing a punched card already present in the reading station KL). The adjusted program is transmitted to the control ST via the lines $L_3$ which control informs the user by optic signals which input has to be operated for composing a complete message. The correct introduction of a punched card is signalled, for example, by closing a contact 30. The contact 25 closes when the variable data have been introduced correctly; the control ST then blocks the keyboard for further introduction of variable data.

When all the introduction means necessary for the adjusted program have been operated and the transmission key SE energized, the transmission of a message is not started immediately. First the control ST signals to the data-handling device via the line H that the device wants to transmit a message. Only after the transmission path to the central station is free and the central station can receive a message, does the date-handling device signal that the transmission of a message can be started by means of the signal G to the control ST. When the message has been transmitted without errors and accepted by the central station, a positive feedback coupling in the data-transmitting device supplies a signal P which operates the return of an introduced punched card. The resetting magnet M1 and the erasing magnet M3 are then energized and produce the erasing of the mechanical memory and the unlocking of the keyboard. All registers and the control can then return to their initial position.

During the whole transmission of a message which starts by energizing the transmission key ST and ends by the positive end signal P, an optic signal shows the user that a transmission of a message is proceeding. When during the transmission of a message errors occur which can be recognized by the receiver, a repeated transmission can take place, the mechanical punched card memory and the punched card still situated in the reading station being sensed again. This repetition is started by a second signal transmitted via the line G from the data-handling device. If in spite of several repetitions a particular message is not received without errors in the central station, the latter supplies a negative return message to the data-handling device which in turn supplies a signal via the line F. This signal F starts an optic and/or acoustic error signal in the device. Via the release key FR the user can now switch off the error alarm and reset the device to its initial position.

What is claimed is:

1. In an apparatus for optically scanning the rows and columns of punched cards the device for introducing variable data to the optical scanner, comprising a plurality of elongated perforated parallel plates mutually slidably mounted for motion parallel to the columns of the punched cards and located in the path of the optical scanning apparatus, the apertures in the plates having the form of holes in a punched card; means for introducing data corresponding to preselected positions for each plate; a lifting slide having a first surface for engaging a single plate; electromagnetically adjustable motor-driven differential driving mechanism for moving the lifting slide, comprising means for driving the slide against a single plate and for moving the single plate in the longitudinal direction of the plate, means for successively moving the engaging surface of the slide successively to each succeeding plate after the adjustment of a preceding plate, a shaft, electromagnetically operated cam means rotatably mounted on the shaft for limiting the motion of the slide in a direction perpendicular to the direction of motion of the plates by contacting a second portion of the slide, and means for axially moving the shaft in response to the contact of the slide against a rotated cam; and a switch responsive to the axially movement of the shaft for disabling the means for introducing data.

2. Apparatus as claimed in claim 1, wherein the means for introducing data comprises a keyboard and wherein the switch comprises means for locking the keyboard.

* * * * *